US009143501B2

(12) United States Patent
Baker et al.

(10) Patent No.: US 9,143,501 B2
(45) Date of Patent: Sep. 22, 2015

(54) REAUTHENTICATION TO A WEB SERVICE WITHOUT DISRUPTION

(75) Inventors: Caleb Geoffrey Baker, Seattle, WA (US); Seng Lin Shee, Redmond, WA (US); Jan Lyk Choo, Seattle, WA (US); Marcelo Albuquerque Fernandes Mas, Kirkland, WA (US); Krishnanand K. Shenoy, Bothell, WA (US); Samuel R. Devasahayam, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 488 days.

(21) Appl. No.: 12/875,778

(22) Filed: Sep. 3, 2010

(65) Prior Publication Data

US 2012/0060210 A1 Mar. 8, 2012

(51) Int. Cl.
*G06F 21/00* (2013.01)
*H04L 29/06* (2006.01)

(52) U.S. Cl.
CPC .................. *H04L 63/0807* (2013.01)

(58) Field of Classification Search
CPC ......... H04L 63/08; H04L 63/20; H04L 63/10; H04L 63/166; H04L 63/0892; H04L 63/1433; H04W 12/06; G06F 21/31
See application file for complete search history.

(56) References Cited

U.S. PATENT DOCUMENTS

| | | | |
|---|---|---|---|
| 7,103,666 B2 | 9/2006 | Royer | |
| 7,343,486 B1 | 3/2008 | McCarty | |
| 2002/0166066 A1* | 11/2002 | Haji et al. | 713/201 |
| 2004/0205176 A1* | 10/2004 | Ting et al. | 709/223 |
| 2006/0026670 A1* | 2/2006 | Potter et al. | 726/7 |
| 2007/0023503 A1* | 2/2007 | Kang | 235/380 |
| 2007/0088831 A1 | 4/2007 | Pallamreddy | |
| 2009/0013310 A1 | 1/2009 | Arner | |
| 2009/0037998 A1* | 2/2009 | Adhya et al. | 726/11 |
| 2009/0094688 A1 | 4/2009 | Roy | |
| 2009/0183243 A1* | 7/2009 | Ruppert et al. | 726/5 |
| 2010/0024006 A1* | 1/2010 | Kailash et al. | 726/4 |
| 2010/0146605 A1 | 6/2010 | Hammell | |

OTHER PUBLICATIONS

Botzum, "IBM WebSphere Developer Technical Journal: Advanced authentication in WebSphere Application Server"—Published Aug. 17, 2005—http://www.ibm.com/developerworks/websphere/techjournal/0508_benantar/0508_benantar.html.

(Continued)

*Primary Examiner* — Shewaye Gelagay
*Assistant Examiner* — Carlton Johnson
(74) *Attorney, Agent, or Firm* — Timothy Churna; Sade Fashokun; Micky Minhas

(57) ABSTRACT

Authenticating internet application sessions. A method includes downloading client side code that when executed implements one or more client side modules including at least one module with message interception functionality. The method includes executing the client side code to implement the one or more client side modules. A request is sent to an internet application server. In response to the request, a message is received from the internet application server indicating that the request is not authorized. The message from the internet application server indicating that the request is not authorized is intercepted at the one or more client side modules. The one or more client side modules, as a result of the message indicating that the request is not authorized, send a request for authentication in a required format for authentication. Authentication is performed without losing user state associated with the request to the internet application server.

35 Claims, 4 Drawing Sheets

(56) References Cited

OTHER PUBLICATIONS

Author Unknown, "Preserving User Identity in Multitiered Environments"—Retrieved Jul. 14, 2010—http://download.oracle.com/docs/cd/B13789_01/network.101/b10773/apdvprxy.htm.

Author Unknown, "Shibboleth"—Published Dec. 14, 2007—http://dev.e-taxonomy.eu/trac/wiki/Shibboleth.

Ramadass, "Unreliable Network Re-Authentication Protocol Based on Hybrid Key Using CSP Approach"—Published Nov. 2007.

* cited by examiner

REAUTHENTICATION TO A WEB SERVICE WITHOUT DISRUPTION

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing system's ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Network connections may be used to connect to client computer systems to internet applications. Internet applications typically reside on an internet application server to which a client computer connects to access functionality of the internet application. For example, an internet application may allow a user at a client computer system to view and interact with personal account information, such as an email account, a banking account, an investment account, etc. Internet applications may use authentication mechanisms to restrict access to only verified users. An authentication state is introduced, which may use an authentication artifact such as an authentication token. The authentication artifact is used to verify the authenticated session and allows the user to perform subsequent access without re-authenticating to the system every time a user request is made. For example, a client computer may authenticate to an identity provider server that provides a token to the client. The client then uses the token, so long as it is valid, to authenticate to an internet application each time a client request is made. In particular, the client system provides the token to the internet application each time a user request is made to the internet application.

Various challenges exist with these types of systems. For example, the authentication artifact may time-out such that partway through user interaction, the authentication artifact becomes invalid. For example, a user at a client may authenticate to an identity provider, which provides a cookie that is valid for 15 minutes. The user may use the token to access an internet banking application. The user may navigate to a web page provided by the internet banking application that allows the user to input data for a fund transfer. Inputting the data into the web page may take longer than the allotted 15 minutes. Thus, when the user submits the data entered into the web page along with the token, the submit request will be invalid from the perspective of the banking internet application because the token will have expired. Typically, this results in a redirection of the web page to a log-in page, which causes the user context data entered into the web page to be lost.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Authenticating internet application sessions. A method includes downloading client side code that when executed implements one or more client side modules including at least one module with message interception functionality. The method includes executing the client side code to implement the one or more client side modules. A request is sent to a internet application server. In response to the request, a message is received from the internet application server indicating that the request is not authorized. The message from the internet application server indicating that the request is not authorized is intercepted at the one or more client side modules. The one or more client side modules, as a result of the message indicating that the request is not authorized, send a request for authentication in a required format for authentication. Authentication is performed without losing user state associated the request to the internet application server. This can be accomplished, for example, by opening a new window for authentication interactions, or by sending locally stored credential information.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

One embodiment may be implemented where a re-authentication module at a client computer detects that a user authentication token has already expired when user tries to perform an action by interacting with a web page of an internet application provided before the authentication token expired. The re-authentication module then creates a container that follows an authentication or re-authentication protocol (possibly involving user interaction) to refresh the token or to obtain a new token without losing user state entered into the web page. This container shares the authentication state with the internet application. The user can then continue with previously intended operations related to the interaction with the web page without losing any context.

Embodiments may be implemented where Rich Internet Applications include functionality for authentication and re-authentication. In particular, Rich Internet Applications, such as those based on Silverlight® available from Microsoft Corporation of Redmond Wash. or Flash® available from Adobe Systems Incorporated of San Jose Calif., may provide client side code to a client system. The client side code implements a client side module that interacts with the Rich Internet Application to determine authentication state and/or facilitate re-authentication. In some of these embodiments, the internet application is aware that a web service request resulting from user interaction with a web page provided by the internet application fails because the user is not authenticated. The internet application may cause a separate re-authentication page to open. However, the web page provided by the internet application and/or the user state entered into the web page are maintained. The internet application, including the client side module, maintains its current state from the moment the user issued a service request (which would fail) to the server. After re-authentication, the user (or the internet application) simply reinitiates the request.

Figure 1:
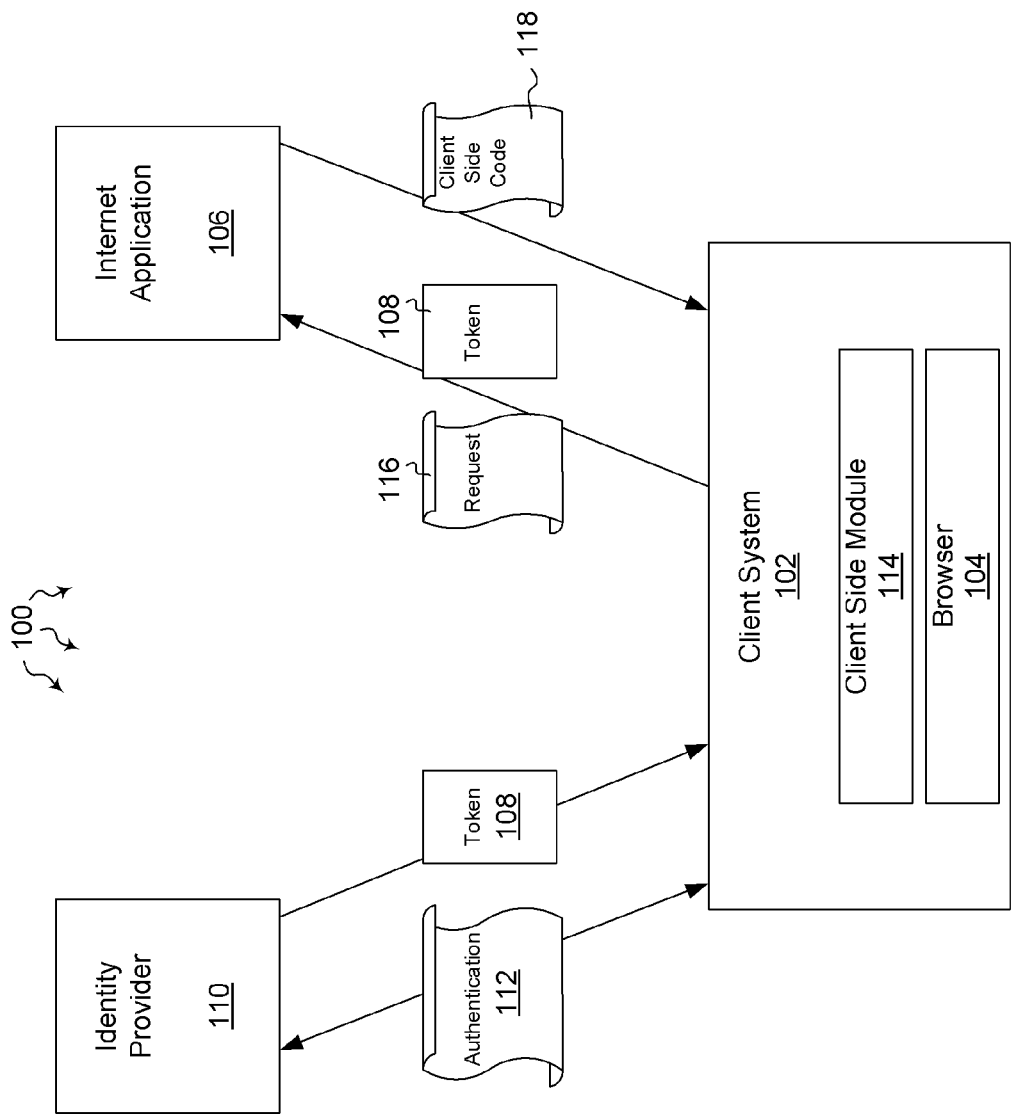
FIG. 1 illustrates a topology including a client that communicates with an Internet application, and a identity provider that facilitates the client and Internet application communicating.

Referring now to FIG. 1, an example embodiment is illustrated. FIG. 1 illustrates a client system 102. The client system 102 includes a browser 104, such as Internet Explorer® available from Microsoft Corporation of Redmond Wash. The browser 104 is configured to connect to various web services through various protocols such as http, https, ftp, etc. The client system 102 may be used by a user that desires to connect to an internet application 106. The internet application 106 may include one or more servers and/or services that include functionality that the client system 102/user desires to access. For example, the internet application may include functionality for implementing account functions, such as functionality for bank accounts, investment accounts, email accounts, on-line store accounts, social networking accounts, comment board accounts, etc.

To access the full functionality of the internet application 106, the internet application 106 may require the user to be authenticated. This may require the user to present an authentication artifact, such as a token, to the internet application 106 when requesting restricted functionality from the internet application 106. As illustrated in the example in FIG. 1, a token 108 may be obtained from an identity provider 110 by exchanging a number of authentication messages 112 using an authentication protocol particular to the authentication provider 110. The token 108 may be used by the client system 102 to interact with the internet application 106. The internet application 106 may include functionality for providing client side code 118 from the internet application 106 to the client system 102. The client side code 118 can be executed at the client system 102 to implement one or more client side modules 114. The client side module 114 can be used, as explained in detail below, to facilitate re-authentication of the client and/or refreshing the token 108.

The client side code 118 may be provided in a number of different ways. In some embodiments, the client side code 118 can be provided to the client system 102 as a result of the client systems initial interaction with the internet application 106. In some embodiments, the client side code 118 may be provided to the client system 102 as a result of the client system 102 sending a valid authentication artifact to the internet application 106.

In some embodiments, client side code 118 may be provided using rich internet application functionality. In particular, some rich internet applications depend on frameworks or applications to be installed at the client computer system 102 prior to the client computer system being able to fully utilize the rich internet application. For example, Silverlight® and Flash® have managed frameworks or applications that are installed at a client system. Silverlight® or Flash® content can be embedded in a web page of an internet application by embedding downloadable client side code 118 that can be executed at a client system 102 using the installed framework or application. Thus, some embodiments may include embedded code that is downloaded to the client system 102 and run using a framework to implement the client side module 114.

The client side module 114 can be used to determine whether or not an authentication artifact has expired and/or refresh the authentication artifact if it has expired. In particular, FIG. 1 illustrates the client system 102 sending a request 116 and a token 108 to the internet application 106 to access functionality of the internet application 106 as defined in the request 116. So long as the token 108 is still valid, the internet application will honor the request 116 to provide the functionality to the client system 102. However, if the token 108 has expired, the client side module 114 can determine that the token 108 has expired and perform actions to refresh the token while preserving state in the request 116 such that the request can be resent without the user needing to re-supply the state to the client system 102.

For example, the user state can be entered by a user into a web page user interface provided by the internet application 106 and rendered at the browser 104. The user then selects a user interface element that causes the user state to be sent as part of a request 116 to the internet application, along with the token 108. If the token is invalid (e.g. it has expired or does not have sufficient authority for the requested operation) then the internet application may send a message according to a defined authentication protocol for the identity provider 110 which would ordinarily cause the web browser 104 to redirect to an authentication user interface, which would cause the web page with the user state to be lost. However, in some embodiments, the client side module 114 can intercept the message sent according to the defined authentication protocol and take actions to preserve the user state in the web page with the user state.

Preservation of user state can be accomplished in one embodiment, by storing the user state in a local cache at the client system 102 prior to redirecting to an authentication user interface. The user state stored in the local cache can be automatically, without user intervention, re-entered into the appropriate web page when later provided. For example, after the user state is stored in the local cache, the browser 104 may be redirected to an authentication interface provided by the identity provider 110. Using the authentication protocol of the identity provider 110 the client system 102 may obtain a new token 108 or refresh an existing token 108. This now valid token 108 can be provided to the internet application 106. In some embodiments, this may be done by the client side module 114 automatically providing the token 108 to the internet application 106 along with the user state. In this case, no additional user interaction would be required to request services requested in the previously sent request 116. Alternatively, this may be done by the client side module 114 providing information about the last web page viewed by the user, i.e. the web page into which the user state was entered.

The internet application 106 would then provide the last web page, and then the client side module (or an associated module) would enter the cached user state into the web page. In some embodiments the user would be able to manually re-submit the request 116 along with the user state by interacting with the web page. In other embodiments, the client side module (or an associated module) would automatically provide the interaction to re-submit the request 116 along with the user state.

In an alternative embodiment, the user state may be preserved by preventing the web page with the user state from being navigated away from. For example, the client side module may cause the browser 104 to open a new page or pop-up window that is directed to an authentication interface provided by the identity provider 110. Using the authentication protocol of the identity provider 110 the client system 102 may obtain a new token 108 or refresh an existing token 108. This now valid token 108 can be provided to the internet application 106. In some embodiments, this may be done by the client side module 114 automatically providing the token 108 to the internet application 106 along with the user state existing in the preserved page. In this case, no additional user interaction would be required to request services requested in the previously sent request 116. Alternatively, this may be done by the client side module 114 simply providing request 116 to the internet application 106. In some embodiments the user would be able to manually re-submit the request 116 along with the user state by interacting with the web page. In other embodiments, the client side module (or an associated module) would automatically provide the interaction to re-submit the request 116 along with the user state.

While the embodiment illustrated above generally show providing an additional user interface which allows a user to interact with the identity provider, such as by providing credentials (e.g. username and password), other embodiments may be implemented where no additional user interaction is required. For example, the client side system 102 may have sufficient stored information or access to credentials, such that the client side module 114 (or an associated module) can automatically perform authentication tasks with the identity provider 110 without additional user intervention. For example, a hardware device, such as a smart card, usb authentication device, etc. may be connected to the client system 102 where the authentication device includes any needed credentials. Alternatively, the client side device may have local caching of authentication credentials where the caching time limits exceed those of the token such that the cached credentials can be used without a user needing to re-enter the credentials. Depending on the implementation, the authentication scheme may be any one of a number of different mechanisms such as, but not limited to, federation, smart card and/or certificate based.

Figure 2:
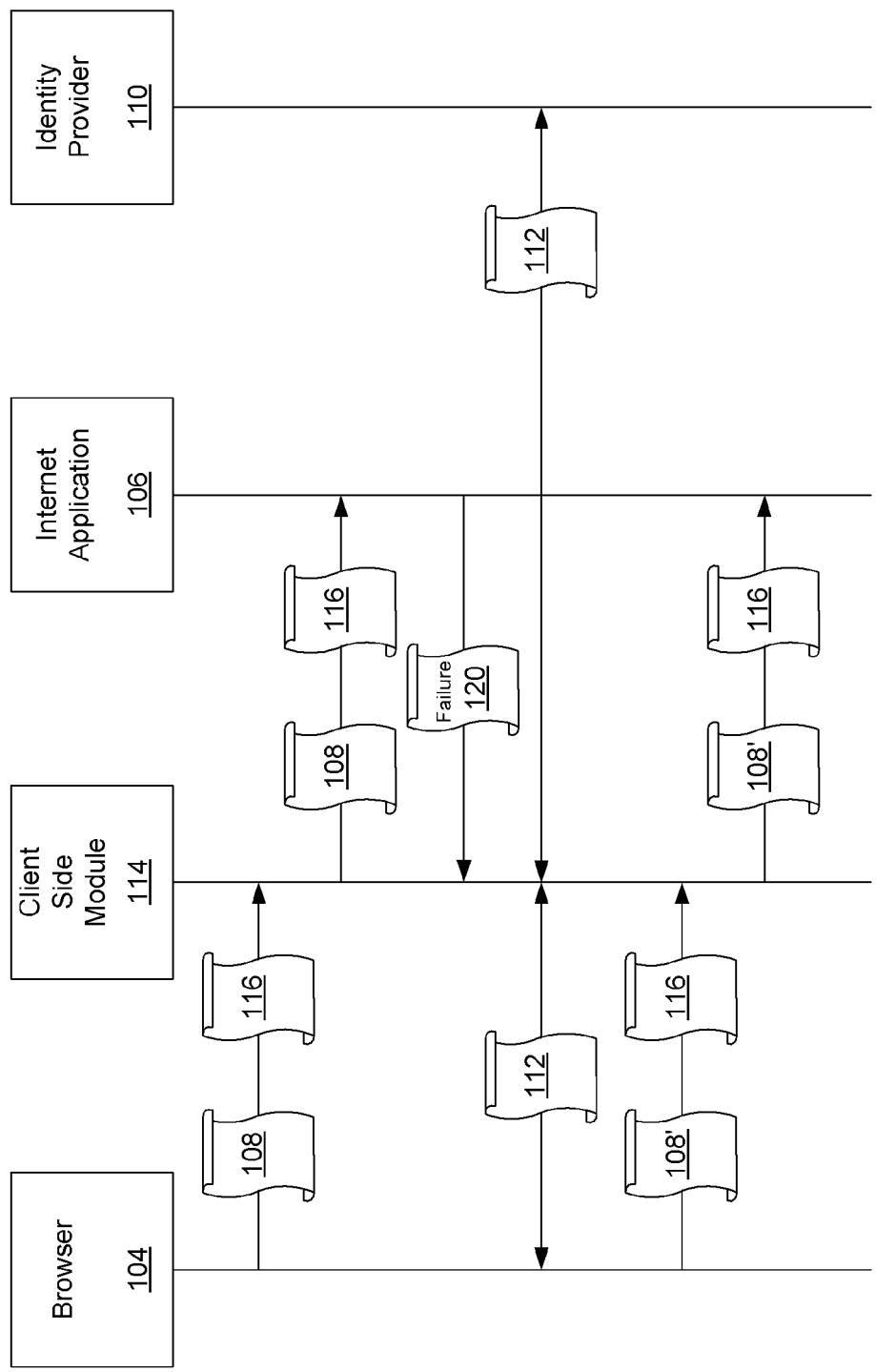
FIG. 2 illustrates a data flow diagram showing communications between the client, the internet application and the identity provider.

Referring now to FIG. 2, a number of different examples of message flow are illustrated illustrating how various embodiments may be implemented. These examples assume that the client side module 114 has already been installed at a client system 102. FIG. 2 illustrates a web browser 104 sending a request 116 for services from the internet application 106. The request 116 may include user context information entered into a browser window of the browser 104 by a user. Along with the request 116, the web browser 104 sends an authentication artifact, such as the token 108. As shown in FIG. 2, the client side module 114 intercepts the request 116 and the token 108. The client side module sends the request 116 and the token 108 to the internet application 106.

As illustrated in FIG. 2, the internet application 106 sends back a failure message 120. The failure message 120 may indicate that the token 108 has expired, is not valid for the type of request 116, or is otherwise not valid. While the failure message 120 is illustrated as a single message, it should be understood that the failure message 120 represents one or more messages sent between entities as part of an authentication protocol. One message may be a redirect message redirecting an entity to a web page or authentication interface of an identity provider, such as the identity provider 110. If the redirect message had been received by the browser 104, the redirect message may have caused the browser to navigate away from the web page containing the user entered context. This may cause the user context to be lost. However, in the embodiment illustrated in FIG. 2, the failure message 120 is intercepted or sent to the client side module 114 and is prevented from being sent to the browser 104. Thus, the browser 104 will not navigate away from the web page with the user entered user context as a result of the failure message 120.

The client side module 114 performs one or more of a number of different operations to facilitate obtaining a valid token 108 or refreshing the token 108. For example, in one embodiment, the client side module 114 can cause a new browser window of the browser 104 to open at the client system 102 (FIG. 1) without closing or navigating away from a current window including user context entered by a user. Authentication interaction can be performed using the new browser window rather than an existing browser window containing user context.

FIG. 2 illustrates authentication messages 112 between the browser 104 and the client side module 114 and between the client side module 114 and the identity provider 110. Authentication messages 112 may be sent in a number of different fashions. For example, in one embodiment, as described previously, the client side module 114 may have access to sufficient information such that the client side module 114 can interact with the identity provider 110 without user interaction at the browser 104 to refresh or renew a token 108. For example, the client side module 114 may have access to information on smart cards, usb authentication devices, parallel port authentication devices, cached credentials, etc that can be used to refresh or renew a token 108. In these embodiments, the client side module 114 may not need to cause a new browser window to open as described above. In alternative embodiments, one or more messages 112 can be sent between the client side module 114 and the browser 104 to allow a user to enter additional credential information. In this example, the new browser window can be used to prevent the browser window with the user state from navigating away and losing the user state.

Once the token 108 has been refreshed or renewed, the token 108 (which at this point may be a completely new token) and request 116 can be resent to the internet application 106. It should be appreciated that renewing or refreshing a token will usually result in a new token being issued. FIG. 2 illustrates this possible difference by showing the original token at 108 and a refreshed or renewed token 108'. FIG. 2 illustrates the browser 104 sending the token 108' and request 116, which may include the user state, to the client side module 114. This may occur as a result of the user resubmitting the request such as by the user selecting a send or other button on an interface shown in the browser 104. The client side module 114 then sends the token 108' and request 116 to the internet application 106. The internet application 106 can then service the request, as the token 108' is now valid.

However, in alternative embodiments, the request 116 may not need to be sent from the browser 104 to the client side module 114. Rather, in some embodiments, the client side module 114 may cache the user state such that the client side module 114 can resend the request 116 and token 108' without further user interaction at the browser 104.

In yet other embodiments, the request 116 and token 108' may be sent from the browser 104 to the client side module 114, but this may nonetheless be done without user interaction. In particular, the client side module 114 may automatically select a user interface element rendered in the browser 104 which causes the browser to send the token 108' and/or the request 116, including the user state stored in the browser window.

The following now illustrate details and scenarios of some embodiments. In some embodiments, every web service call by the internet application is registered with a call back which checks for an error. If the error is determined to be caused by an unauthenticated call, a browser window is invoked. The invoked page has one or more scripts that either automatically close the window or shows the user status. As the user is not authenticated, the user is redirected to an authentication page. Depending on the site implementation, the authentication scheme may be through federation, smart card or certificate based. The user is then redirected back to the previously invoked page which finally loads and executes the scripts.

In some embodiments, a user logs on to an internet application using a standard web browser and an authentication artifact. The user uses the application or leaves the application open until the authentication artifact expires. When the user performs an action through the application, the request fails. The application is aware that request has failed and initiates a side window for reauthentication. The user reauthenticates and closes the side window. The authentication method depends on the deployment details on the internet application side. The user continues with the operation.

Some embodiments may be useful in that a user never leaves the current application session. In particular, the user may be filling out a detail form when the authentication artifact expires. However, the user does not need worry that an action needs to be repeated or saved elsewhere when a reauthentication occurs.

Additionally, in some embodiments, a user is able to switch identities if a particular operation requires higher privileges, without leaving the session. In particular, a failure message 120 may be sent as a result of a token 108 being associated with privileges that are not high enough for a given request 116. However, the user can authenticate to a new token with higher privileges without losing user state using the embodiments described herein.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
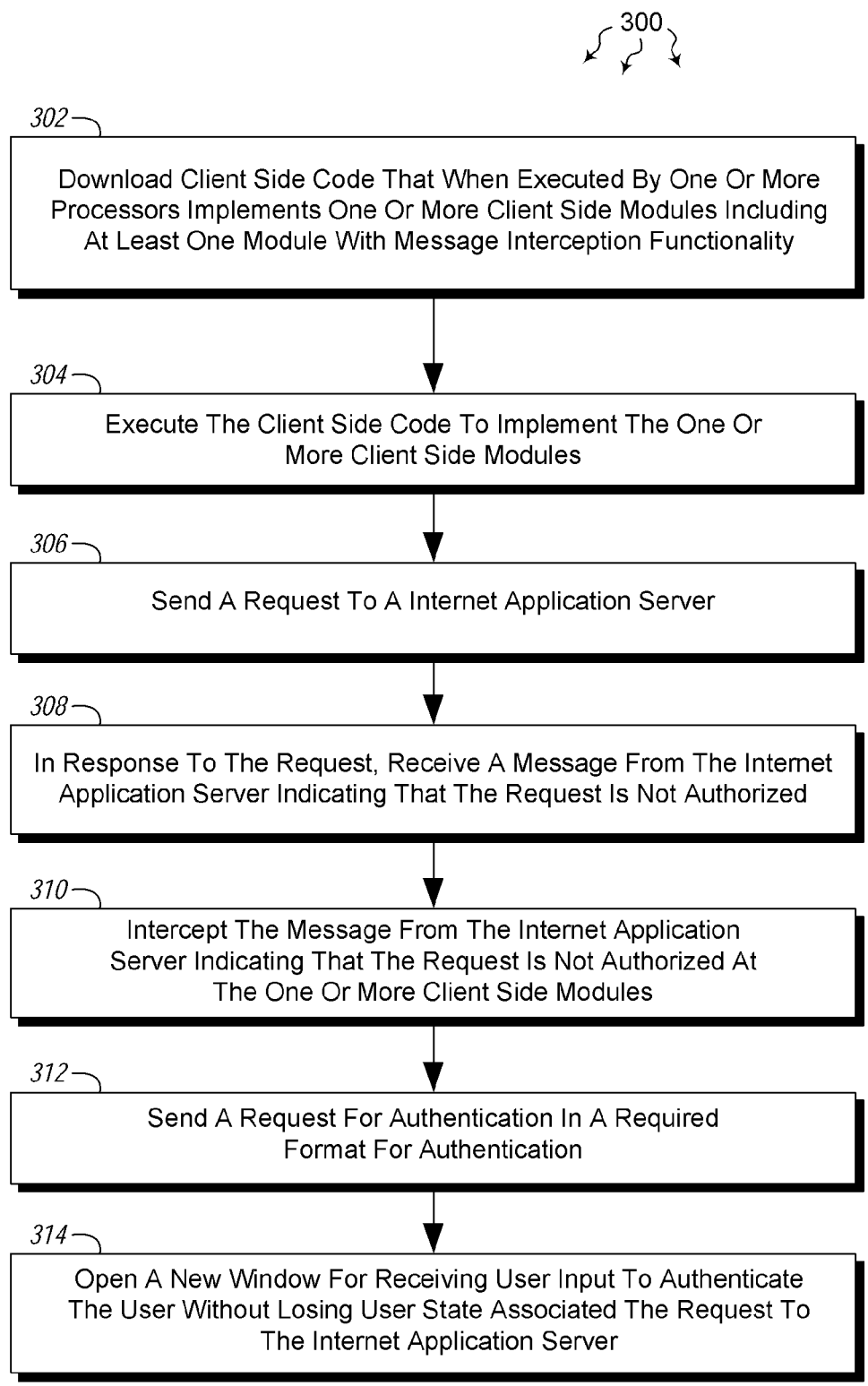
FIG. 3 illustrates a method of authenticating and/or re-authenticating internet application sessions.

Referring now to FIG. 3, a method 300 is illustrated. The method 300 may be practiced, for example, in a computing environment and includes acts for authenticating and/or re-authenticating internet application sessions. The method 300 includes downloading client side code that when executed by one or more processors implements one or more client side modules including at least one module with message interception functionality (act 302). For example, as illustrated in FIG. 1, a client system 102 can download client side code 118, which can then be used to implement the client side module 114.

The method 300 further includes executing the client side code to implement the one or more client side modules (act 304). As noted, an example is illustrated in FIG. 1, where the client side module 114 is implemented.

The method 300 further includes sending a request to an internet application server (act 306). For example, FIG. 1 illustrates a request 116 sent to the internet application 106.

In response to the request, the method 300 further includes receiving a message from the internet application server indicating that the request is not authorized (act 308). As has been discussed above and as will be discussed in more detail below, a request may be not authorized for a number of different reasons. For example, a request may not be authorized because some authentication artifact has expired. Alternatively, a request may not be authorized because the requestor does not have sufficient permissions.

The method 300 further includes intercepting the message from the internet application server indicating that the request is not authorized at the one or more client side modules (act 310). In particular, the one or more client side modules 114 (FIG. 2), including a module with interception functionality may intercept messages 120 from the internet application 106.

The method 300 further includes the one or more client side modules, as a result of the message indicating that the request is not authorized, sending a request for authentication in a required format for authentication (act 312). For example, FIG. 2 illustrates a message 112 being sent between the client side module 114 and the identity provider 110 to authenticate a user.

The method 300 further includes opening a new window for receiving user input to authenticate the user without losing user state associated the request to the internet application server (act 314). Thus, for example, a new window may be opened without a window containing previously entered user state being navigated away from.

The method 300 may be practiced where sending a request for authentication comprises sending the request to an authentication server separate from the internet application server. Thus, as shown in FIGS. 1 and 2, an authentication request may be sent to a separate identity provider 110. Alternatively, the method 300 may be practiced where sending a request for authentication comprises sending the request to the internet application server. For example, an authentication request may be sent to an internet application server which includes an identity provider, or has other means for causing authentication to be accomplished.

The method 300 may be practiced where sending a request for authentication comprises sending a request using an authentication protocol. In particular, identity providers may have a particular protocol used. For example, message may follow a particular order or format. Client side modules may be designed to be able to correctly communicate using the authentication protocol.

The method 300 may be practiced where receiving a message indicating that the request is not authorized is a result of a token expiring. For example, a token may expire after an initial authentication due to a given time elapsing. Alternatively, the method 300 may be practiced where receiving a message indicating that the request is not authorized is a result of an authentication artifact not having sufficient permission. For example, a user may have authenticated using an authentication artifact that only provides limited access or functionality. If a user, although authenticated, does not have sufficient permissions, a request may not be authorized due to the limitations on permissions and not necessarily because the user was not authenticated at all. However, embodiments, can nonetheless by used to allow a user to authenticate with credentials that provide more allowed access.

The method 300 may further include, the one or more client side modules resending the request automatically, after the user has been authenticated without losing user state associated with the request to the internet application server. In particular, the client side modules may be able to resend the request, including the user state automatically without user intervention. This may be done for example, by sending cached information, or by automatically interacting with user interface elements in a web page.

Figure 4:
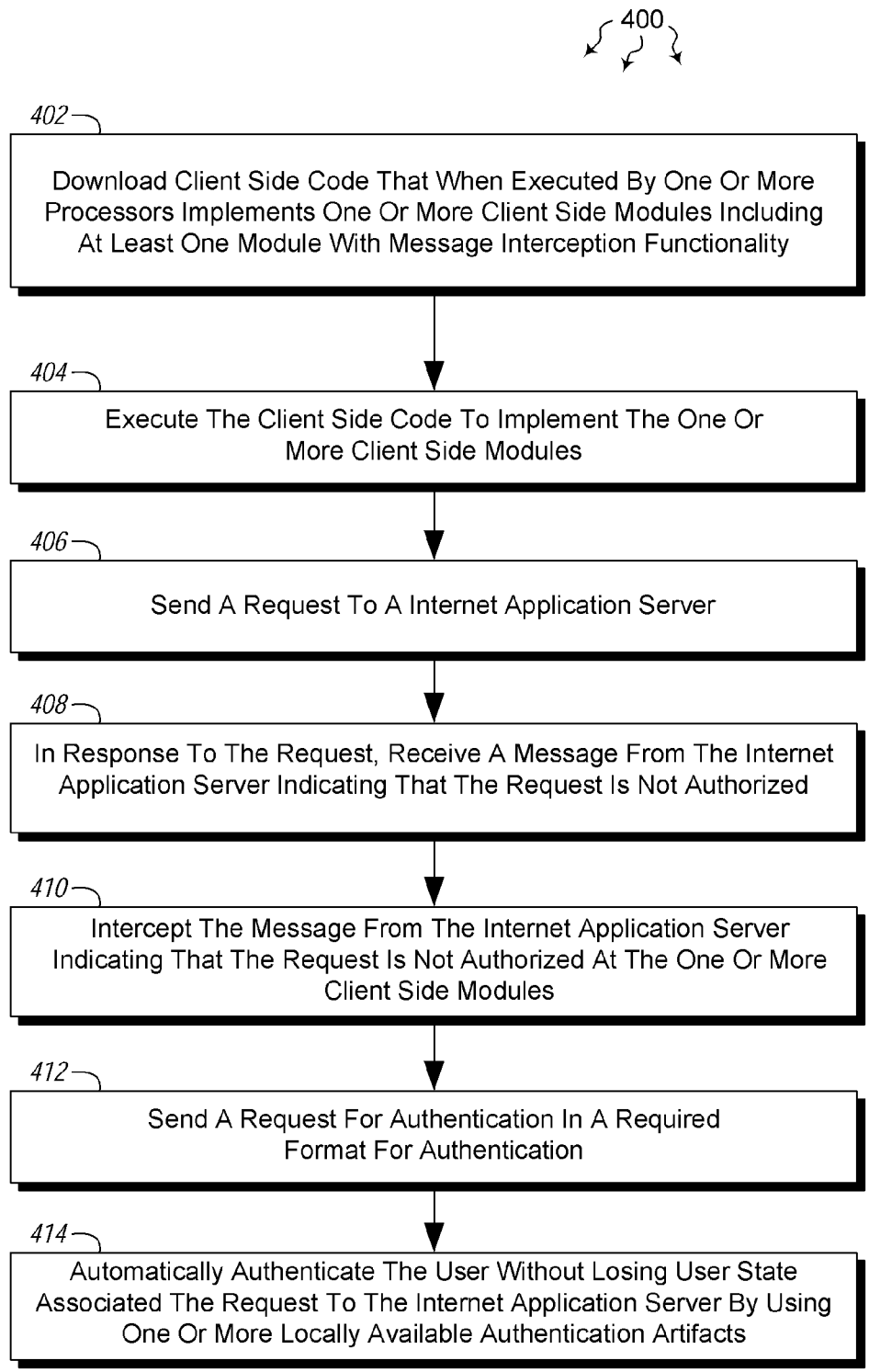
FIG. 4 illustrates another method of authenticating and/or re-authenticating internet application sessions.

Referring now to FIG. 4, a method 400 is illustrated. The method 400 may be practiced, for example, in a computing environment and includes acts for authenticating and/or re-authenticating internet application sessions. The method 400 includes downloading client side code that when executed by one or more processors implements one or more client side modules including at least one module with message interception functionality (act 402). For example, as illustrated in FIG. 1, a client system 102 can download client side code 118, which can then be used to implement the client side module 114.

The method 400 further includes executing the client side code to implement the one or more client side modules (act 404). As noted, an example is illustrated in FIG. 1, where the client side module 114 is implemented.

The method 400 further includes sending a request to an internet application server (act 406). For example, FIG. 1 illustrates a request 116 sent to the internet application 106.

In response to the request, the method 400 further includes receiving a message from the internet application server indicating that the request is not authorized (act 408). As has been discussed above, a request may not be authorized for a number of different reasons. For example, a request may not be authorized because some authentication artifact has expired. Alternatively, a request may not be authorized because the requestor does not have sufficient permissions.

The method 400 further includes intercepting the message from the internet application server indicating that the request is not authorized at the one or more client side modules (act 410). In particular, the one or more client side modules 114 (FIG. 2), including a module with interception functionality may intercept messages 120 from the internet application 106.

The method 400 further includes the one or more client side modules, as a result of the message indicating that the request is not authorized, sending a request for authentication in a required format for authentication (act 412).

The method 400 further includes the one or more client side modules automatically authenticating the user without losing user state associated the request to the internet application server by using one or more locally available authentication artifacts (act 414). For example, authentication artifacts associated with smart cards, a usb authentication device, or cached credentials may be used to authenticate or re-authenticate a user.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry a desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment which includes a client computer system and an internet application server, a method of re-authenticating an internet application session after authentication fails subsequent to previous authentication, without disrupting the internet application session as a result of the re-authentication, the method comprising:
   executing at the client computer system client side code to implement one or more client side modules including at least one module for intercepting an authentication failure message;
   after having established authentication with the internet application server, the client computer system sending a client application request to the internet application server, the request being associated with a user state associated with a session corresponding to the established authentication;
   in response to the request, the client system receiving an authentication failure message from the application server that indicates that the request is not authorized at the application server, the received authentication failure message indicating that the previously established authentication has failed;
   at the at least one client side module for intercepting an authentication failure message, intercepting the authentication failure message, the authentication failure message having been sent from the application server to the client system, so that the authentication failure message is prevented from disrupting the application request and losing the user state; and
   in response to intercepting the authentication failure message, the one or more client side modules preserving the user state, sending a request for re-authentication in a required format for authentication to the internet application server, and causing the client computer to re-authenticate the user to the internet application server without disrupting the session and without losing the user state associated with the request such that the request to the application server can be resent to the application server with the preserved user state after re-authentication.

2. The method of claim 1, wherein re-authentication comprises sending the request for re-authentication to an authentication server separate from the internet application server.

3. The method of claim 1, wherein re-authentication comprises sending the request for re-authentication to the internet application server.

4. The method of claim 1, wherein re-authentication comprises sending a request for re-authentication using an authentication protocol.

5. The method of claim 1, wherein the authentication failure message is a result of a token expiring.

6. The method of claim 1, wherein the authentication failure message is a result of an authentication artifact not having sufficient permission.

7. The method of claim 1, further comprising, persisting user state associated with the request while the user is re-authenticated.

8. The method of claim 1, wherein downloading client side code is performed as a result of a client's initial interaction with the internet application server.

9. The method of claim 1, wherein downloading client side code is performed as a result of a client sending a valid authentication artifact to the internet application server.

10. The method of claim 1, wherein executing the client side code to implement the one or more client side modules comprises executing the client side code in the context of a managed framework.

11. The method of claim 10, wherein downloading client side code is performed as a result of a code intended for the managed framework being embedded in a web page of an internet application hosted by the internet application server.

12. In a computing environment which includes a client computer system and an internet application server, a method of re-authenticating an internet application session in the event authentication fails after an initial authentication, without disrupting the internet application session as a result of the re-authentication, the method comprising:
   executing at the client computer system client side code to implement one or more client side modules including at least one module for intercepting an authentication failure message;
   after having established authentication with the internet application server, the client computer system sending a client application request to the internet application server, the request being associated with a user state associated with a session corresponding to the established authentication;
   in response to the request, the client system receiving an authentication failure message from the application server that indicates that the request is not authorized at the application server, the received authentication failure message indicating that the previously established authentication has failed;
   at the at least one client side module for intercepting an authentication failure message intercepting the authentication failure message, the authentication failure message having been sent from the application server to the client system, so that the authentication failure message is prevented from disrupting the application request and losing the user state; and
   in response to intercepting the authentication failure message, the one or more client side modules automatically preserving the user state, and sending a request for re-authentication in a required format for authentication to the internet application server by using one or more locally available authentication artifacts such that the request to the application server can be resent to the application server with the preserved user state after re-authentication.

13. The method of claim 12, wherein the one or more locally available authentication artifacts comprise information on a smart card.

14. The method of claim 12, wherein the one or more locally available authentication artifacts comprise a usb authentication device.

15. The method of claim 12, wherein the one or more locally available authentication artifacts comprise a cached credential.

16. The method of claim 12, wherein the authentication failure message is a result of a token expiring.

17. The method of claim 12, wherein the authentication failure message is a result of an authentication artifact not having sufficient permission.

18. A computer program product comprising one or more computer-readable memory devices containing computer-executable instructions for implementing a method of re-authenticating an internet application session after authentication fails subsequent to initial authentication, without disrupting the internet application session as a result of the re-authentication, and the method comprising:

executing at the client computer system client side code to implement one or more client side modules including at least one module for intercepting an authentication failure message;

after having established authentication with an internet application server, the client computer system sending a client application request to the internet application server, the request being associated with a user state associated with a session corresponding to the established authentication;

in response to the request, the client system receiving an authentication failure message from the application server that indicates that the request is not authorized at the application server, the received authentication failure message indicating that the previously established authentication has failed;

at the at least one client side module for intercepting an authentication failure message intercepting the authentication failure message, the authentication failure message having been sent from the application server to the client system, so that the authentication failure message is prevented from disrupting the application request and losing the user state; and in response to intercepting the authentication failure message, the one or more client side modules preserving the user state, and performing at least one of the following re-authentication procedures:

sending a request for re-authentication in a required format for authentication to the internet application server, and causing the client computer to open a new window for receiving user input to re-authenticate the user without losing user state associated with the request to the internet application server; or automatically and without losing user state associated with the request sending a request for re-authentication to the internet application server in a required format for authentication by using one or more locally available authentication artifacts;

such that the application request to the application server can be resent to the application server with the preserved user state after re-authentication.

19. A system for performing a method of re-authenticating an internet application session after authentication fails subsequent to previous authentication, without disrupting the internet application session as a result of the re-authentication, the system comprising one or more computer processors, system memory, and computer-executable instructions which, when executed upon the one or more processors, cause the system to perform the steps comprising:

executing at a client computer system client side code to implement one or more client side modules including at least one module for intercepting an authentication failure message;

after having established authentication with an internet application server, the client computer system sending a client application request to the internet application server, the request being associated with a user state associated with a session corresponding to the established authentication;

in response to the request, the client system receiving an authentication failure message from the application server that indicates that the request is not authorized at the application server, the received authentication failure message indicating that the previously established authentication has failed;

at the at least one client side module for intercepting an authentication failure message, intercepting the authentication failure message, the authentication failure message having been sent from the application server to the client system, so that the authentication failure message is prevented from disrupting the application request and losing the user state; and in response to intercepting the authentication failure message, the one or more client side modules preserving the user state, sending a request for re-authentication in a required format for authentication to the internet application server, and causing the client computer to re-authenticate the user to the internet application server without disrupting the session and without losing the user state associated with the request such that the request to the application server can be resent to the application server with the preserved user state after re-authentication.

20. The system of claim 19, wherein re-authentication comprises sending the request for re-authentication to an authentication server separate from the internet application server.

21. The system of claim 19, wherein re-authentication comprises sending the request for re-authentication to the internet application server.

22. The system of claim 19, wherein re-authentication comprises sending a request for re-authentication using an authentication protocol.

23. The system of claim 19, wherein the authentication failure message is a result of a token expiring.

24. The system of claim 19, wherein the authentication failure message is a result of an authentication artifact not having sufficient permission.

25. The system of claim 19, further comprising, persisting user state associated with the request while the user is re-authenticated.

26. The system of claim 19, wherein downloading client side code is performed as a result of a client's initial interaction with the internet application server.

27. The system of claim 19, wherein downloading client side code is performed as a result of a client sending a valid authentication artifact to the internet application server.

28. The system of claim 19, wherein executing the client side code to implement the one or more client side modules comprises executing the client side code in the context of a managed framework.

29. The system of claim 28, wherein downloading client side code is performed as a result of a code intended for the managed framework being embedded in a web page of an internet application hosted by the internet application server.

30. A system for performing a method of re-authenticating an internet application session in the event authentication fails after an initial authentication, without disrupting the internet application session as a result of the re-authentication, the system comprising one or more computer processors, system memory, and computer-executable instructions which, when executed upon the one or more processors, cause the system to perform the steps comprising:

executing at a client computer system client side code to implement one or more client side modules including at least one module for intercepting an authentication failure message;

after having established authentication with an internet application server, the client computer system sending a client application request to the internet application server, the request being associated with a user state associated with a session corresponding to the established authentication;

in response to the request, the client system receiving an authentication failure message from the application server that indicates that the request is not authorized at the application server, the received authentication failure message indicating that the previously established authentication has failed;

at the at least one client side module for intercepting an authentication failure message intercepting the authentication failure message, the authentication failure message having been sent from the application server to the client system, so that the authentication failure message is prevented from disrupting the application request and losing the user state; and in response to intercepting the authentication failure message, the one or more client side modules automatically preserving the user state, and sending a request for re-authentication in a required format for authentication to the internet application server by using one or more locally available authentication artifacts such that the request to the application server can be resent to the application server with the preserved user state after re-authentication.

31. The system of claim 30, wherein the one or more locally available authentication artifacts comprise information on a smart card.

32. The system of claim 30, wherein the one or more locally available authentication artifacts comprise a usb authentication device.

33. The system of claim 30, wherein the one or more locally available authentication artifacts comprise a cached credential.

34. The system of claim 30, wherein the authentication failure message is a result of a token expiring.

35. The system of claim 30, wherein the authentication failure message is a result of an authentication artifact not having sufficient permission.

* * * * *